UNITED STATES PATENT OFFICE.

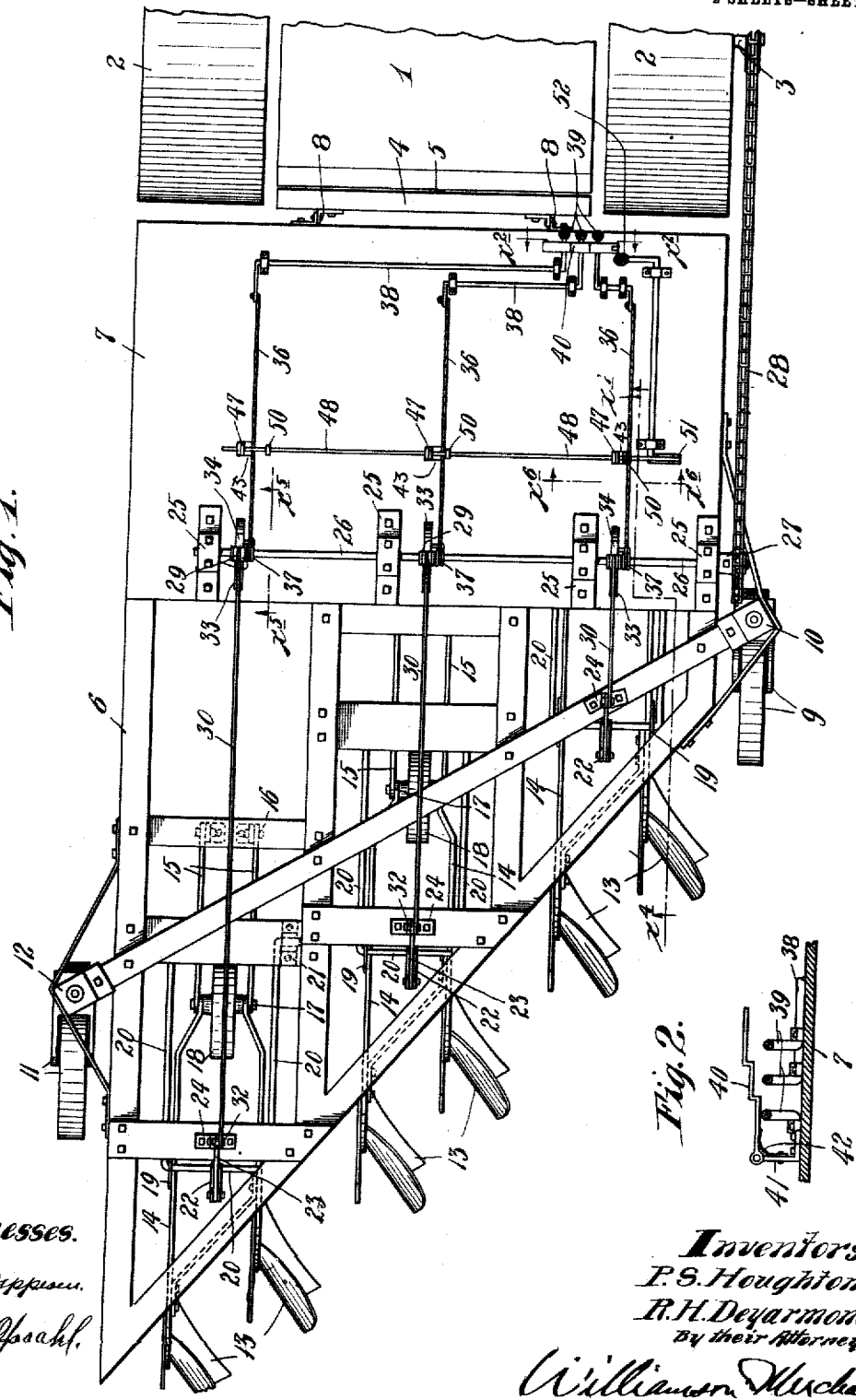

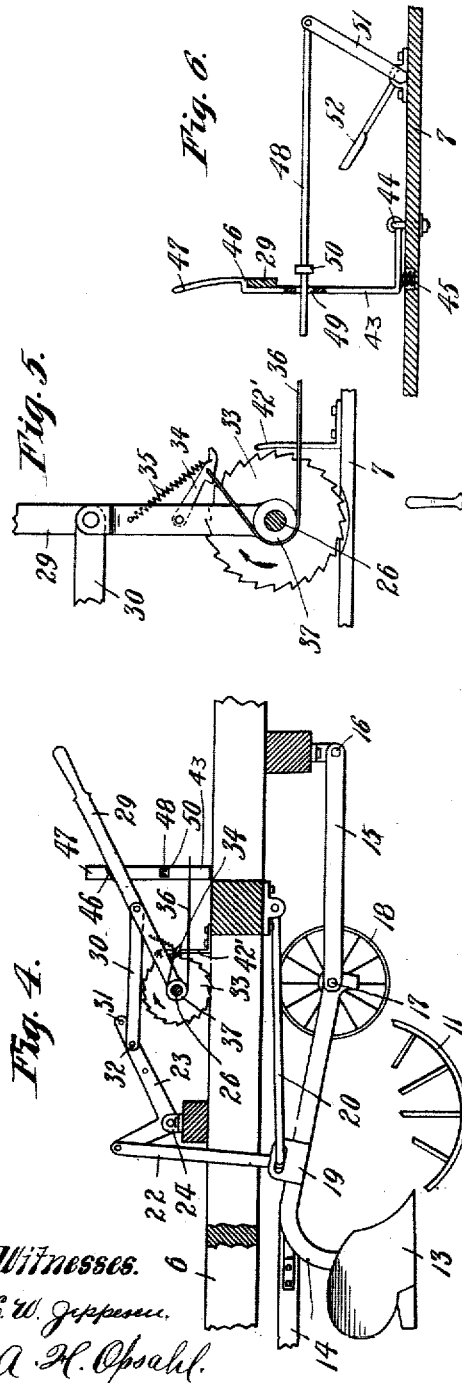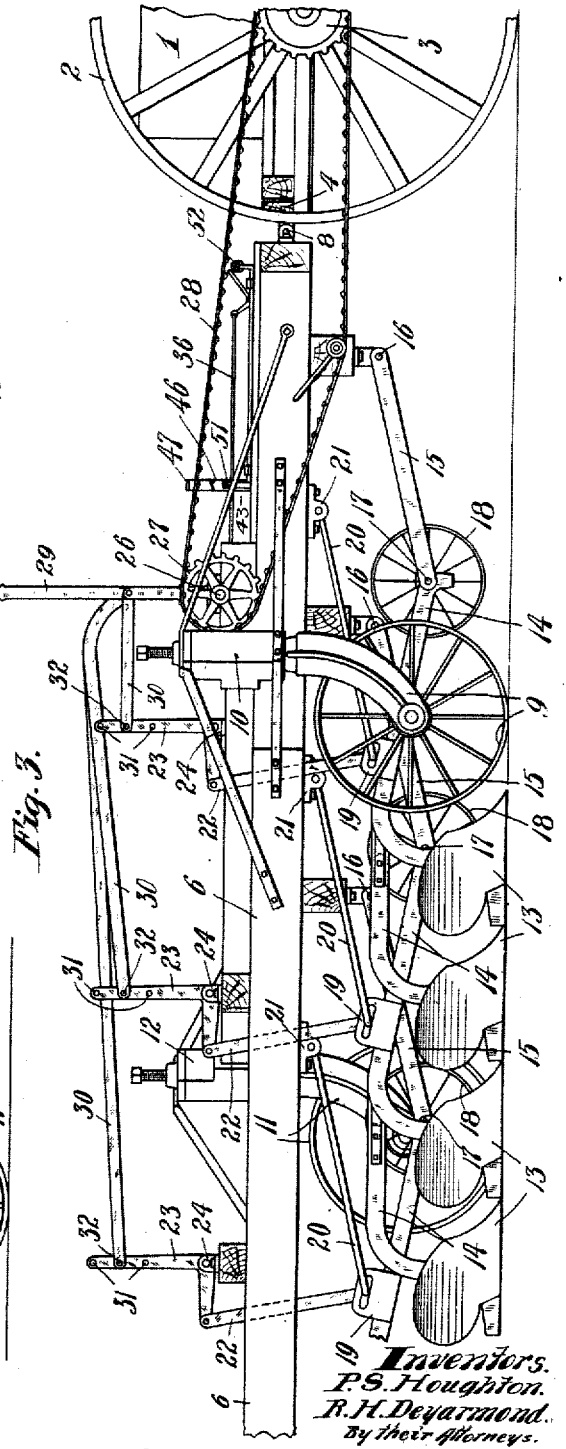

PHILIP S. HOUGHTON AND RICHARD H. DEYARMOND, OF GRAND FORKS, NORTH DAKOTA.

GANG-PLOW.

No. 814,046.  Specification of Letters Patent.  Patented March 6, 1906.

Application filed October 2, 1905. Serial No. 280,868.

*To all whom it may concern:*

Be it known that we, PHILIP S. HOUGHTON and RICHARD H. DEYARMOND, citizens of the United States, residing at Grand Forks, in the county of Grand Forks and State of North Dakota, have invented certain new and useful Improvements in Gang-Plows; and we do hereby declare the following to be a full, clear, and exact description of the invention, such as will enable others skilled in the art to which it appertains to make and use the same.

Our invention relates to gang-plows, and especially to those that are used as attachments to traction-engines and are drawn thereby.

One of the principal features of the invention is directed to improved means for raising and lowering the several plows or several sets of plows, and it includes means whereby the power from the engine may be utilized to raise the heavy plows out of the ground.

The invention is illustrated in the accompanying drawings, wherein like characters indicate like parts throughout the several views.

Figure 1 is a plan view showing the improved gang-plow attached to a traction-engine, only the rear portion of the latter being shown. Fig. 2 is a detail in transverse vertical section taken on the line $x^2 x^2$ of Fig. 1. Fig. 3 is a side elevation of the parts shown in Fig. 1. Fig. 4 is a vertical section taken from front to rear of the plow on the irregular line $x^4 x^4$ of Fig. 1. Fig. 5 is a detail in section on the line $x^5 x^5$ of Fig. 1, and Fig. 6 is a detail in section on the line $x^6 x^6$ of Fig. 1.

Of the parts of the traction-engine shown in the drawings, the numeral 1 indicates the frame, the numeral 2 the traction-wheels, and the numeral 3 the sprocket, carried by the hub of one of said traction-wheels.

The numeral 4 indicates a beam the intermediate portion of which is pivotally connected at 5 to the rear portion of the frame 1, with freedom for oscillatory movements in a vertical plane transversely of the engine.

The numeral 6 indicates as an entirety the frame of the plow, which frame is approximately triangular in plan view, is trussed and braced, and is provided at its forward portion with a platform-section 7, upon which latter the operator may stand. The extreme forward portion of the plow-frame is pivotally connected to the ends of the oscillatory beam 4 by hinge-like couplings 8. The inclined rear ends of the plow-frame recede rearward and toward the left with respect to the direction of travel of the engine and the plow attachment. The right-hand side of the plow-frame is supported by a heavy caster-wheel 9, the fork of which is journaled in a bearing 10, that projects from the right-hand side of said frame. The left-hand side of the plow-frame is likewise supported by a heavy caster-wheel 11, the fork of which is journaled in a bearing 12, that is rigidly secured to and projects from the left-hand side of said frame. The caster-wheel 9 is located considerably ahead of the caster-wheel 11, so that the latter wheel constitutes the chief support for the rear portion of the plow-frame.

The plows 13 are located in a diagonally-extended row and, as shown, approximately underlie the oblique rear edge of the plow-frame 6. The plows 13 are rigidly connected to the rear ends of plow-beams 14, that are pivotally connected to corresponding drag-bars 15, which in turn are pivotally attached at their forward ends to the bearings 16, rigidly secured to the forward under portion of the plow-frame. The plow-beams 14 and drag-bars 15 are connected in laterally-spaced pairs by bolts 17, that also afford spindles to ground-wheels that are interposed between the said laterally-spaced pairs of parts. On each plow-beam 14 is a slotted plate 19. The plates 19 are connected in pairs by transverse rear portions of lifting-bails 20, which bails are pivoted at their forward ends to bearings 21 on the under portion of the frame 6. The intermediate transverse rear portions of the lifting-bails 20 are pivotally connected to the lower ends of lifting-links 22, which at their upper ends are pivoted to the lower arms of bell-crank levers 23, which in turn are pivoted to bearings 24 on the upper portion of the plow-frame 6.

Journaled in bearings 25 on the platform 7 is a transverse counter-shaft 26, that is provided at its right-hand end with a sprocket 27, over which and the sprocket 3 of the right-hand traction-wheel 2 is mounted to run a long sprocket-chain 28. This counter-shaft 26 will therefore be kept under rotation by the advance movement of the traction-engine.

For each bell-crank 23, and hence for each pair of plows, there is a lifting-lever 29, which is pivoted on the counter-shaft 26 and is connected to the upper arm of the corresponding bell-crank 23 by a long link 30. The links 30 are adjustably attached to the upturned arms of the respective bell-cranks 6, this, as shown, being accomplished by providing the arms of said bell-cranks with several perforations 31 for the reception of the coupling-pin 32. The several links 30 are of different length because of the different positions of the bell-cranks 23 with respect to the counter-shaft 26. The levers 29 as far up as their pivotal connections with the links 30 are bifurcated, and between the prongs of each thereof is a ratchet-wheel 33. The several ratchet-wheels 33 are rigidly secured to the counter-shaft 26. Pivoted to each lever 29 for coöperation with the corresponding ratchet-wheel 33 is a pawl 34, that is normally held out of engagement with the teeth thereof by a coiled spring 35. (Best shown in Fig. 5.) The free ends of each pawl 34 are attached to the rear ends of flexible connections 36, that run over guide-sheaves 37 on the shaft 26 and extend forward. Mounted in suitable bearings on the forward portion of the platform 7 and extending transversely thereof are a plurality of crank-shafts 38, of which there is one for each flexible connection 36. The said flexible connections 36 at their forward ends are attached to the crank-arms of the respective crank-shafts 38, and the said crank-shafts are provided with forwardly-projecting foot-pieces or arm-like projections 39, that extend side by side in close proximity. The several pawls 34 may be thrown into engagement with the teeth of the respective ratchet-wheel 33 by stepping on the corresponding foot-pieces 39. We also provide means whereby the several foot-pieces 39 may be depressed by one action, and this device is preferably in the form of a stepped or zigzagged foot-piece 40, that overlies the arms of the several foot-pieces 39, is pivoted at one end to a bracket 41 on the platform 7, and is yieldingly held upward by a spring 42. (For this construction see Figs. 1 and 2.) In front of each ratchet-wheel 33 and rigidly secured to the platform 7 is a pawl arm or projection 42', that lies in the path of movement of the beveled end of the corresponding pawl and is adapted to positively release the same from its ratchet-wheel at a time and for a purpose which will hereinafter appear. When the levers 29 are forced forward and downward, approximately as shown in Fig. 4, the plows will be raised out of the ground and in inoperative positions, and in such positions said levers are adapted to be locked by latches 43, that are pivoted to the platform 7 at 44, are subject to compressed coiled springs 45, and are provided at their free upper ends with lock-shoulders 46 and with cam extensions 47. When the levers 29 are pressed downward, they engage the cam extensions 47 and press the latches 43 laterally, so that the said levers pass below the lock-shoulders 46, whereupon the said levers become locked by said shoulders. The transversely-extended trip-rod 48 is, as shown, passed through perforations 49 in the several latches 43 and for action on the latches is provided with trip collars or projections 50. At one end the trip-rod 48 is pivotally connected to the rear arm of the rock-shaft 51, that is mounted in suitable bearings on the platform 7 and is provided at its forward end with a foot-piece 52. Normally, or when the plow is being drawn over the road or from place to place with the plows out of action, the plows are locked in their uppermost positions by the respective latches 43. By reference to Fig. 1 it will be seen that the trip-collar 50 of the trip-rod 48 at the extreme right looking at the plows from the rear normally stands just out of engagement with the right-hand latch 43, that the intermediate trip-collar 50 stands a considerable distance away from the intermediate latch 43, and that the left-hand trip-collar 50 stands a still greater distance away from the left-hand latch 43. With this construction it follows that when the operator steps upon the foot-piece 52 of the crankshaft 51 the trip-rod 48 will be forced toward the left and the pairs of plows from the right toward the left will be dropped into action one after the other. By this arrangement and by the proper manipulation of the trip-rod 48 the several pairs of plows may be started into action on approximately the same transverse line. Furthermore, by throwing the plows into action in succession the machine is relieved from sudden or intense strains that would be produced by throwing all of the plows into action at the same time. When the plows are in action, the wheels 18 run over the ground and limit the downward pitch of the plow-beams.

Very considerable force is required to lift the plows out of the ground, and hence the desirability of the means already described, whereby power from the engine may be utilized to lift the plows. The action of these plow-lifting devices more specifically described is as follows: By stepping on one of the foot-pieces 39 the pawl 34 of the corresponding lifting-lever 29 is thrown into engagement with the coöperating ratchet-wheel 33 of the constantly-driven shaft 26. When the lifting-lever is thus coupled to said ratchet-wheel for rotation with said shaft, the forward-and-downward rotary movement of the lever 29, acting through the link 30, bell-crank 23, and link 22, positively lifts the corresponding pair of plows. When sufficient movement has been imparted to the lever 29 to accomplish the raising of the plows, as above described, the corresponding latch 43 operates on said lever to latch the same against return movement. A very slight movement of the lever 29 in excess of that required to raise the plows subjects said lever to its latch 43, brings the beveled end of the pawl 34 against the pawl-trip 42', thereby positively forcing said pawl out of engagement with the teeth of the ratchet-wheel 33. Of course the foot should be removed from the foot-piece 39 before the lever 29 has been moved to its extreme position, thereby permitting the pawl 34 to be released by its spring 35. The pawl-trip 42', however, operates as a safety device to positively force the pawl out of engagement with the ratchet-wheel at the proper time to prevent breaking of the parts in case the said pawl should not be released by its spring 25 or in case the operator should neglect to remove his foot from said foot-piece. As already indicated, by stepping on the common foot-piece 40 all three of the foot-pieces 39 will be depressed and all the plow-lifting devices will be thrown into action. It is important, however, to note (see Fig. 2) that the foot-piece 40 is so formed that when depressed it will depress in succession the foot-pieces 39, thereby throwing the several plow-lifting levers into action in succession, and thereby gradually subjecting the shaft 26 to its maximum lifting load. In Fig. 3 the lifting-levers 29 are, as shown, turned vertically upward and the plows are shown as resting upon the ground. When the plows are dropped below the surface of the ground, or, in other words, into action, said levers 29 will of course be turned backward, or toward, the rear of the machine.

We do not, of course, limit ourselves to the details of construction illustrated in the drawings and herein specifically described. The devices for lifting the plows and for dropping them to their work are thought to be broadly new.

The invention also involves other features of construction, all of which will be particularly pointed out in the claims.

What we claim, and desire to secure by Letters Patent of the United States, is as follows:

1. In a gang-plow, the combination with a power-driven shaft, of a plurality of independent plow-lifting devices arranged to be connected to said shaft at will, substantially as described.

2. In a gang-plow, the combination with a power-driven shaft provided with several ratchet-wheels, of plow-lifting levers having independent connections to the plows and provided with pawls for coupling them to the respective ratchet-wheels, at will, substantially as described.

3. The combination with a traction-driven gang-plow, of a shaft driven from one of the traction-wheels, a plurality of plow-lifting devices, and independent means for coupling said plow-lifting devices to said shaft at will, to effect the lifting of the plows, substantially as described.

4. In a gang-plow, the combination with a shaft and means for rotating the same, under the forward movement of the machine, of a plurality of independent plow-lifting devices, and means for coupling said plow-lifting devices to said shaft and for disconnecting the same therefrom, substantially as described.

5. In a gang-plow, the combination with a shaft and power-actuated means for rotating the same, of independent plow-lifting devices, means for coupling said plow-lifting devices to said shaft at will, latches operative on said plow-lifting devices to hold the plows in raised positions, and means for automatically disconnecting said plow-lifting devices from said shaft, after they have been secured by said latches, substantially as described.

6. In a power-driven gang-plow, a plow-lifting device, and means whereby said lifting device may be operated at will, either by hand or by the power device of said gang-plow, substantially as described.

7. In a gang-plow, the combination with a power-driven counter-shaft having a plurality of ratchet-wheels, of lifting-levers pivoted on said shaft and connected to the plows, pawls carried by said levers and normally held out of engagement with the teeth of the respective ratchet-wheels, independent connections for throwing said pawls into action on their respective ratchet-wheels at will, latches operative on said levers to hold the plows in raised positions, and independent trips for positively forcing said pawls out of engagement with said ratchet-wheels, after said levers have been secured by said latches, substantially as described.

8. In a gang-plow, the combination with a power-driven shaft, of a plurality of independent plow-lifting devices, means for coupling said plow-lifting devices to said shaft, at will, involving a common controller arranged to couple the several lifting devices in succession, substantially as described.

9. In a gang-plow, the combination with a power-driven shaft, a plurality of independent plow-lifting devices, means for coupling said plow-lifting devices to said shaft, latches operative on said plow-lifting devices to hold the plows in raised positions, and a latch-trip arranged to trip the several latches in succession, substantially as described.

In testimony whereof we affix our signatures in presence of two witnesses.

PHILIP S. HOUGHTON.
RICHARD H. DEYARMOND.

Witnesses:
R. H. BOSARD
G. L. SHEEKS.